(12) United States Patent
Susuki et al.

(10) Patent No.: US 6,377,407 B1
(45) Date of Patent: Apr. 23, 2002

(54) OPTICAL SCANNING DEVICE HAVING AN IMPROVED RESPONSE CHARACTERISTIC

(75) Inventors: Tsuneo Susuki, Mönchweiler; Reiner Baas, Steinach; Uwe Bartels, Villingen-Schwenningen; Ralf Bausch, Loefflingen, all of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/647,020
(22) PCT Filed: Mar. 22, 1999
(86) PCT No.: PCT/EP99/01933
§ 371 Date: Sep. 26, 2000
§ 102(e) Date: Sep. 26, 2000
(87) PCT Pub. No.: WO99/52102
PCT Pub. Date: Oct. 14, 1999

(30) Foreign Application Priority Data

Apr. 2, 1998 (DE) .......................... 198 14 777

(51) Int. Cl.⁷ .............. G02B 7/02; G11B 7/00
(52) U.S. Cl. ............ 359/814; 359/824; 369/44.14; 369/44.16
(58) Field of Search ................. 359/814, 824, 359/819, 822; 369/44.15, 44.14

(56) References Cited

U.S. PATENT DOCUMENTS

| | | | |
|---|---|---|---|
| 5,068,844 A | 11/1991 | Tanaka | 369/44.16 |
| 5,555,228 A | 9/1996 | Izuka | 369/44.15 |

FOREIGN PATENT DOCUMENTS

JP   2000-215477 A   8/2000   ............ G11B/7/09

*Primary Examiner*—Ricky Mack
(74) *Attorney, Agent, or Firm*—Joseph S. Tripoli; Frederick A. Wein

(57) ABSTRACT

An optical scanning device having an improved response characteristic, for use in an apparatus for optically reading or writing information in one or more tracks on a recording medium. The object of the invention is to provide an optical scanning device which, without any electronic compensation means, very largely avoids resonance peaks and has an improved response characteristic. According to the invention, this object is achieved by a retaining plate which supports the objective lens of the scanning device via bearing elements and has at least one cutout, which separates the mounting points, in the surface which holds the bearing elements for the objective lens holder. The field of application of the invention is optical scanning devices having an improved response characteristic for use in equipment for reading or writing information on an optical recording medium, such as a CD, DVD, a CD or DVD which can be written to, or else a magneto-optical recording medium, for example.

5 Claims, 9 Drawing Sheets

OPTICAL SCANNING DEVICE HAVING AN IMPROVED RESPONSE CHARACTERISTIC

FIELD OF THE INVENTION

The invention relates to an optical scanning device having an improved response characteristic, for use in an apparatus for optically reading or writing information in one or more tracks on a recording medium, which may be, for example, a compact disc (known as a CD), a digital versatile disc (known as a DVD), a CD or DVD which can be written to, or else a magneto-optical recording medium.

BACKGROUND OF THE INVENTION

Scanning devices for optical recording media are generally known. The construction and operation of an optical scanning apparatus, of a so-called optical pickup, are described in Electronic Components & Applications, Vol. 6, No. 4, 1984, pages 209–215. Such scanning devices have a so-called actuator on which an objective lens is arranged, which is provided for tracking and for focusing the light beam or laser beam on the optical recording medium. In principle, optical scanning devices may be distinguished by the way in which the objective lens is suspended. For example, in the case of a known leaf-spring actuator, the objective lens holder is secured by means of four parallel leaf springs on a frame, cf. EP-A 0 178 077. The disadvantages are that such spring arrangements have an undesirable tendency to oscillate and involve a high level of assembly complexity. Parallel guidance of the objective lens holder is also achieved by an actuator of the jointed or hinged type, as is known, for example, from EP-B 0 563 034. An actuator with parallel guidance has been found to be relatively stable in terms of tilting of the objective lens during deflection, but involves a high level of adjustment complexity since it needs to be aligned exactly in terms of the movement directions that are guided by joints.

Another type of objective lens holder is to use four wires which, as bearing elements, connect the objective lens holder to the actuator baseplate. Socalled wire pick-ups can be produced more costeffectively than optical scanning devices having a leaf spring or joint. However, they have been found to be disadvantageous in comparison with other parallel guides, in terms of tilting of the objective lens and guidance characteristics.

One quality criterion of optical scanning devices is their response characteristic, in which case the term response characteristic means the reaction of the optical scanning device to control signals by means of which the scanning device is deflected for focusing or for tracking, in order to scan a specific point on the recording medium or to follow the movement of the recording medium. The movement of the optical scanning device is intended to follow the applied control signals very accurately. However, as a rule, excitation of a mechanical system leads to sympathetic oscillation in the region of the resonant frequency and to a so-called resonance peak which has a negative effect on the response characteristic and the reaction of the optical scanning device to control signals. Since the resonant frequency is frequently in the range that is audible by the human ear, this effect is furthermore evident in a negative manner as so-called howling. U.S. Pat. No. 4,477,755 has already disclosed the use of a circuit arrangement for electronic compensation of optical and mechanical instabilities in the focusing and tracking control loop in order to avoid mechanical resonances and howling. The circuit arrangement contains a model of the mechanical system, by means of which the reaction of the scanning device to control signals is monitored, and the movement of the scanning device is stopped if a predetermined threshold value is exceeded. For this purpose, the circuit contains a filter and a variable-gain amplifier in order to produce a control signal compensation component at a selected frequency in the region of the frequencies at which mechanical resonances are significant.

SUMMARY OF THE INVENTION

The object of the invention is to provide an optical scanning device which, without any electronic compensation means, very largely avoids resonance peaks and has an improved response characteristic.

This object is achieved by the features of the invention specified in independent claims. Advantageous developments of the invention are specified in dependent claims.

One aspect of the invention is to design an optical scanning device in such a manner that it follows applied control signals as uniformly as possible and without any resonance peak occurring.

It has been found that resonance phenomena are significantly influenced by the characteristics of a retaining plate on which the means for bearing the objective lens holder are secured. It has been found that disadvantageous resonance peaks are avoided by the means for bearing the objective lens holder being supported in a flexible manner. On the other hand, the options for selecting an oscillation-damping material for the retaining plate are limited, since, on the one hand, the retaining plate has to bear the weight of the objective lens and the objective lens holder and, on the other hand, it is necessary to ensure that the actuator returns to its original position after it has been deflected. This means that the retaining plate must not be deformed by either force or temperature influences. The contradictory requirements for high flexibility and high strength are satisfied by a retaining plate in which those points on the retaining plate which hold the bearing elements for the objective lens holder are very largely mechanically decoupled. The mechanical decoupling of those points on the retaining plate which hold the bearing elements for the objective lens holder is achieved by a retaining plate which has notches or cutouts in the surface which holds the bearing elements for the objective lens holder. These notches are provided in such a way that, on the one hand, straight edges of the surface which holds the bearing elements are interrupted by notches or openings in the form of slots and, on the other hand, cutouts are provided in the interior of the surface to reduce the effective area between the mounting points for the bearing elements of the objective lens. In one version of the invention, the mounting points are designed as island surfaces which are connected via constrictions to the surface which bears them. This type of configuration for the retaining plate significantly improves the response characteristic of the optical scanning device, and resonance peaks are avoided. The term response characteristic means, in particular, the reaction of the optical scanning device to control signals, as reflected in the frequency response and the relative phase, and in the transfer function of the control signals to the optical scanning system. Resonance peaks are very largely avoided without any electronic compensation means. This effect is rather surprising since it had to be assumed that supporting the bearing elements of the objective lens on a comparatively more highly sprung surface would lead to increased resonance peaks.

The said retaining plate is preferably combined with a second retaining plate to form a retaining system, in which case the second retaining plate makes it possible in an advantageous manner for the first retaining plate to be designed to be thinner, for additional damping to be ensured in the lower frequency range and, furthermore, for the maximum deflection of the actuator to be limited. In the case of one configuration which is provided as a wire pick-up, the wires which are provided as bearing elements are passed through openings in the second retaining plate and are secured on the first retaining plate by, for example, a soldering process. The intermediate space which then remains in the openings for the wire in the second retaining plate is then filled with a filling compound. Silicone is preferably used as the filling compound in order to damp resonance peaks that occur in the low-frequency range. Although it had to be assumed that embedding the wires used as bearing elements in silicone in the second retaining plate would significantly damp resonance peaks, it was found, however, that this is true only to an insufficient extent. The desired response characteristic is achieved only in combination with the first retaining plate according to the invention.

BRIEF DESCRIPTION OF THE DRAWINGS

The invention will be explained in more detail in the following text using an exemplary embodiment and with reference to drawings, in which.

DETAILED DESCRIPTION OF THE PREFERRED EMBODIMENTS

Figure 11:
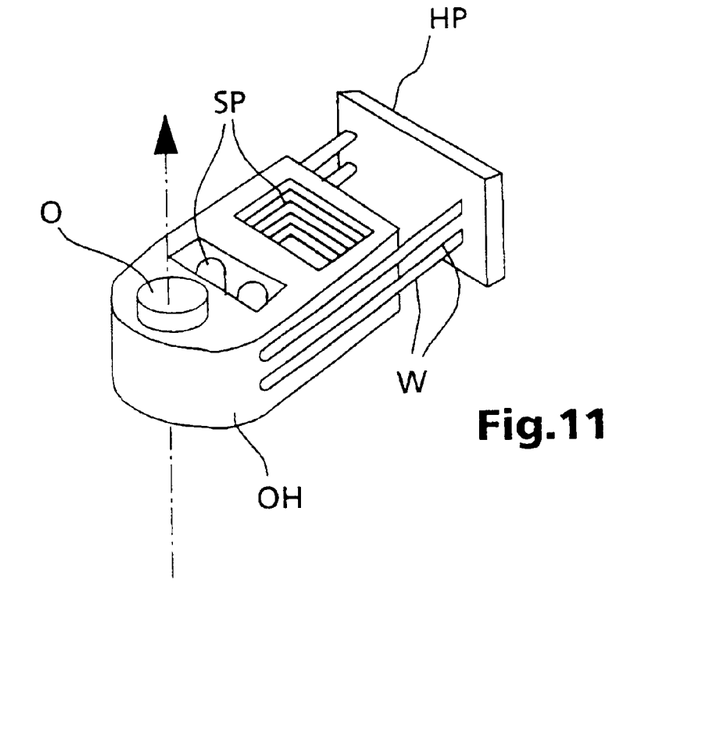
FIG. 11 shows an outline sketch of an objective lens holder which is secured by wires on a known retaining plate.
Figure 12:
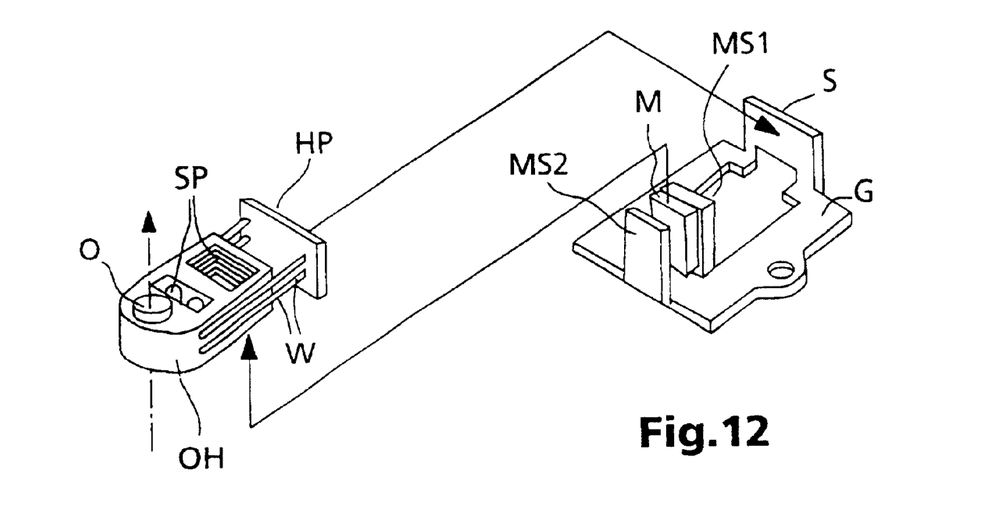
FIG. 12 shows an outline sketch relating to the assembly of an objective lens holder, which is secured by wires on a known retaining plate, to form an actuator.
Figure 13:
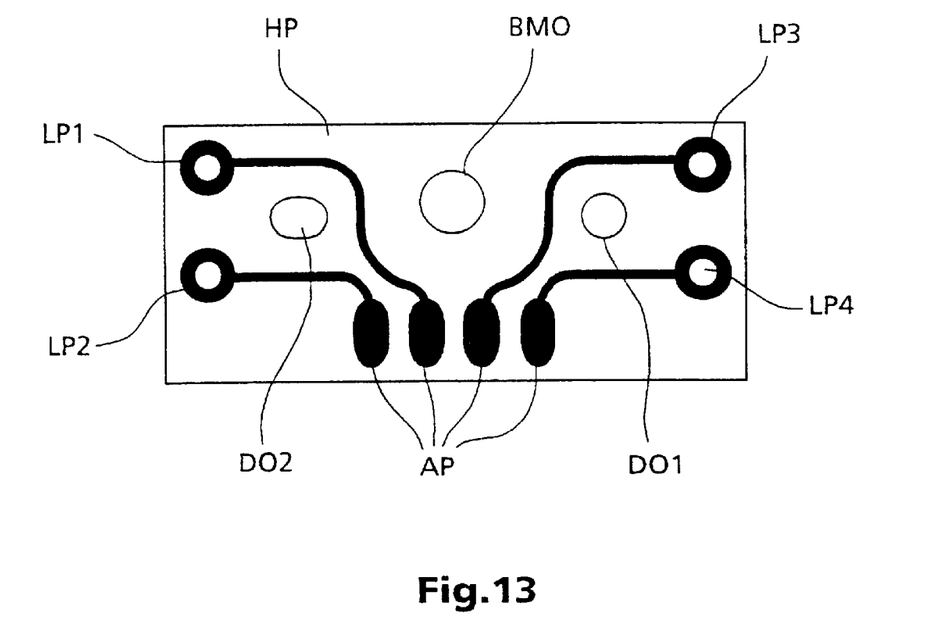
FIG. 13 shows an outline sketch of the conductor side of an optical scanning device having a known retaining plate.

The same reference symbols are used in all the figures. FIG. 11 shows an outline sketch of a known objective lens holder OH, which is secured by wires W on a known retaining plate HP. Four wires W, which are secured on the retaining plate HP, bear an objective lens holder OH, arranged on which there are an objective lens O which is provided for focusing and tracking the light beam or laser beam on an optical recording medium, and coils SP for deflecting the objective lens O. The wires W, which are used as bearing elements, in this case form a flexible support for the objective lens holder OH, and are at the same time used to supply electrical power to the coils SP arranged on the objective lens holder OH. The retaining plate HP on which the objective lens holder OH is supported by the four wires W is formed by a rectangular surface which, corresponding to FIG. 12, is connected to a web S on a baseplate G, which web S extends at right angles from the baseplate G. In consequence, corresponding to FIG. 12, the coils SP provided in recesses in the objective lens holder OH are moved to a position which allows interaction with magnet webs MS1; MS2. The magnet webs MS1; MS2 likewise extend at right angles from the baseplate G and parallel to the web S to which the retaining plate HP is secured, and form a magnetic field which, by interacting with the magnetic fields produced by the coils SP allows the objective lens O to be deflected in a desired manner from a rest position. The magnetic field originating from the magnet webs MS1; MS2 is preferably produced by at least one permanent magnet M, which is secured to a magnet web MS1. As already mentioned, electrical power is supplied to the coils SP provided on the objective lens holder OH via the wires W by means of which the objective lens holder OH is secured on the retaining plate HP. In order to secure the wires W, a retaining plate HP illustrated in FIG. 13 has solder points LP1, LP2, LP3, LP4, which are provided as holes in a retaining plate HP designed as a printed circuit board. The wires W are passed through the holes and are connected by soldering to the retaining plate HP on which solder lands are provided, for this purpose, in the region of the holes. The solder lands or solder points LP1, LP2, LP3, LP4 are connected via conductor tracks to connection points AP, to which control signals for deflecting the objective lens O are supplied. In addition, pin openings DO1; DO2 are provided in the retaining plate HP, for alignment of the retaining plate HP on the web S, and a mounting opening BMO is provided for fitting of the retaining plate HP. As has been determined by measurements, such optical scanning devices have the disadvantage that they do not unconditionally follow the applied control signals. The deflection of the objective lens holder OH with the objective lens O and the coils SP represents a mechanical excitation and leads, in critical frequency ranges, to a so-called resonance peak, as is illustrated in principle in FIGS. 7 and 9 by the response characteristic's deviations from a profile that is as uniform as possible.

Figure 1:
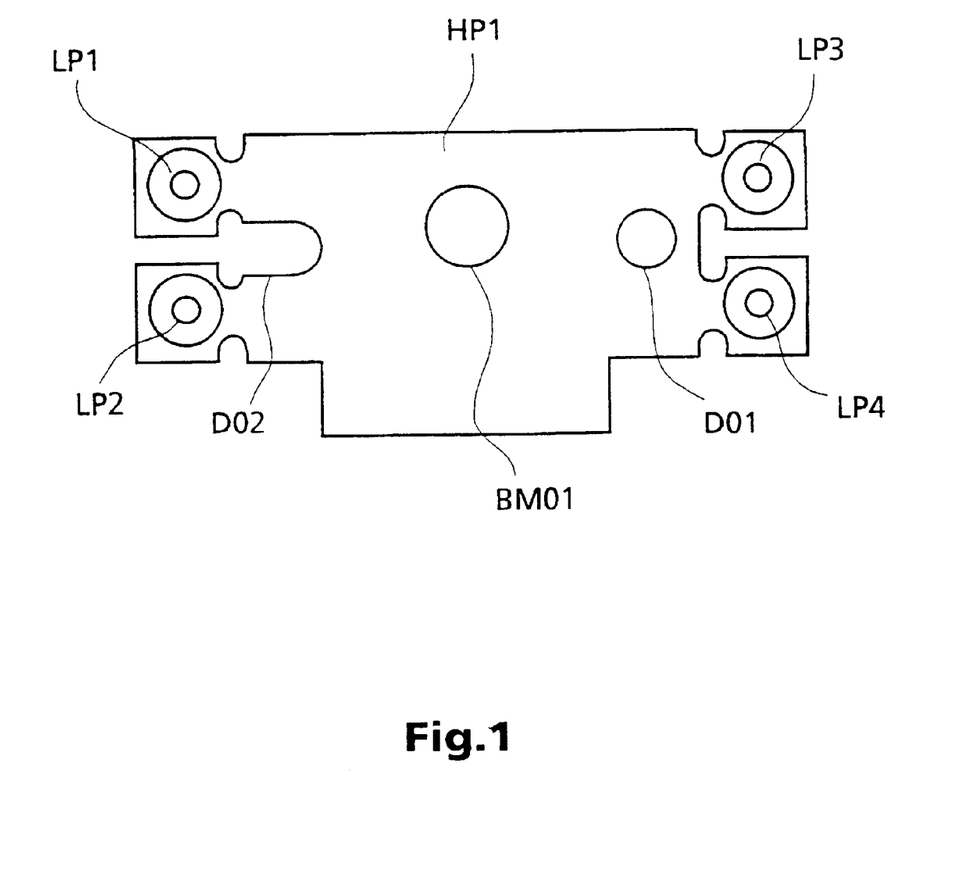
FIG. 1 shows an outline sketch of a retaining plate of an optical scanning device having an improved response characteristic.

Such resonance peaks not only have a disadvantageous influence on the control or regulation characteristic of the optical scanning device but, owing to oscillation in the audible frequency range, also lead to so-called howling in a disadvantageous manner. As a rule, suppression of resonance peaks requires additional measures in the provision of the control signals, as can be achieved, for example, by equalization for linearization of the frequency response. In order to avoid disadvantageous characteristics and in order to save additional means for driving optical scanning devices, an optical scanning device is proposed which has an improved response characteristic. This is characterized by a retaining plate HP1 as illustrated in FIG. 1, which has cutouts in the surface which holds the bearing elements for the objective lens holder OH in the solder points LP1 . . . LP4, which cutouts separate the mounting points or solder points LP . . . LP4 from one another. The mounting points or solder points LP1 . . . LP4 are designed as island surfaces, which are connected via constrictions to the surface which bears them. The fact that resonance peaks are avoided by a retaining plate HP1 designed in such a way is rather surprising in the case of the optical scanning system according to the invention, since it was also possible to find the intended effect using a retaining system corresponding to FIG. 2 and FIG. 3, comprising a first retaining plate HP1 and a second retaining plate HP2.

Figure 2:
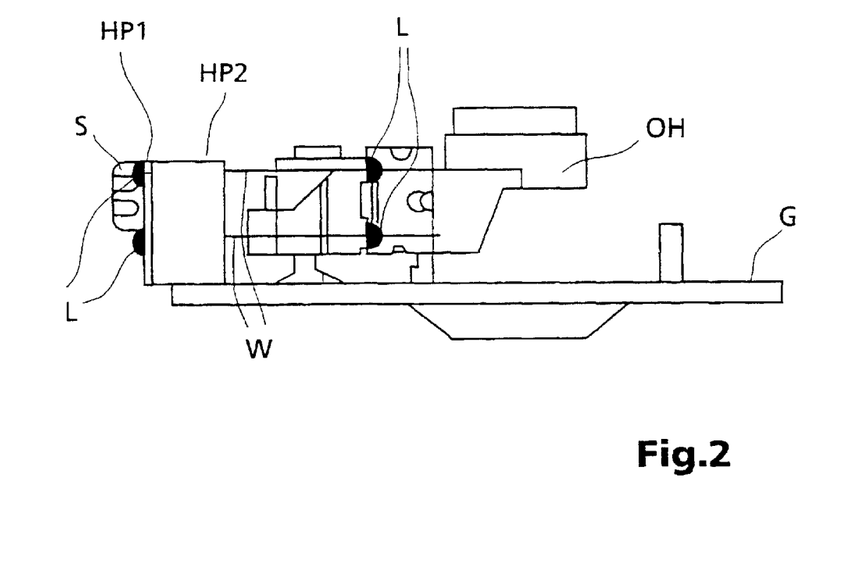
FIG. 2 shows an outline sketch of a side view of an optical scanning device having an improved response characteristic.
Figure 3:
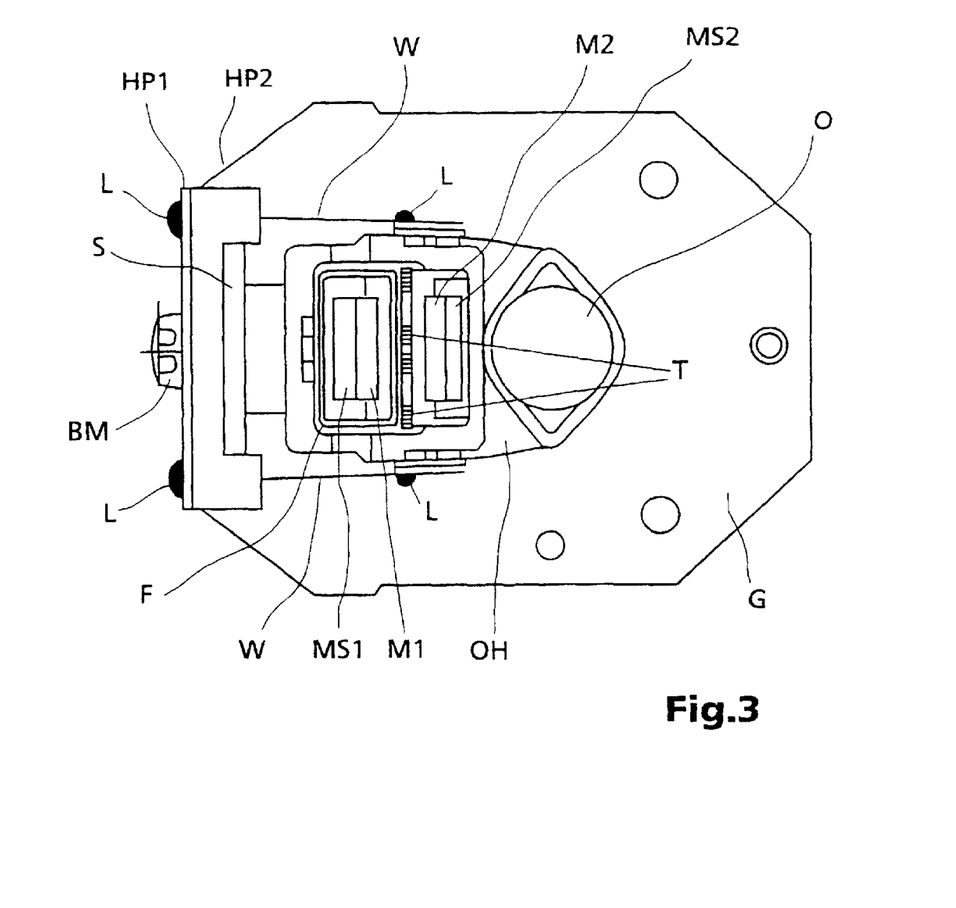
FIG. 3 shows an outline sketch of a plan view of an optical scanning device having an improved response characteristic.

The optical scanning device illustrated in FIGS. 2 and 3 has a first retaining plate HP1 and a second retaining plate HP2, on which the wires W are supported which are used as bearing elements for the objective lens holder OH. The wires W in this case form a flexible support for the objective lens holder OH, on which the objective lens O and a focusing coil F as well as tracking coils T are arranged. Control signals are applied to the focusing coil F and/or tracking coils T and produce a magnetic field in these coils, which magnetic field interacts with a magnetic field produced by two permanent magnets M1, M2 to allow the objective lens O to be deflected from a rest position. The wires W that are used as bearing elements are used to supply the control signals to the focusing coil F and tracking coils T and are connected at solder pads L to the objective lens holder OH and to the first retaining plate HP1. The permanent magnets M1, M2 are secured on magnet webs MS1, MS2 which project at right angles from a baseplate G, and the first retaining plate HP1 and the second retaining plate HP2 are connected via a securing means BM to a web S, which likewise projects at right angles from the baseplate G. The first retaining plate HP1 is in this case aligned, by means of pin openings DO1, DO2 provided in the first retaining plate HP1, with corresponding pins D on the second retaining plate HP2.

Figure 4:
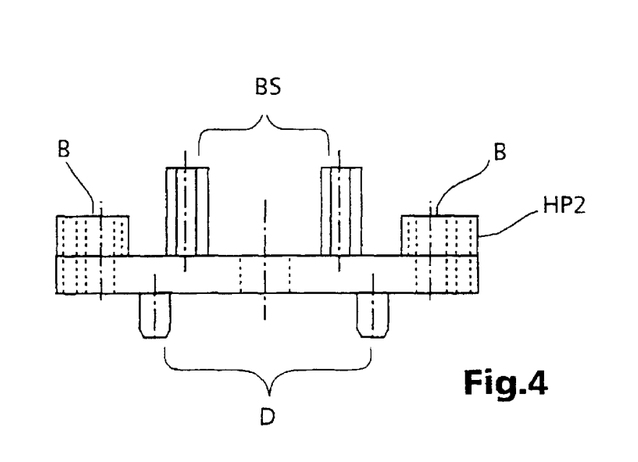
FIG. 4 shows an outline sketch of a plan view of a second retaining plate of an optical scanning device having limiting means.
Figures 5, 6:
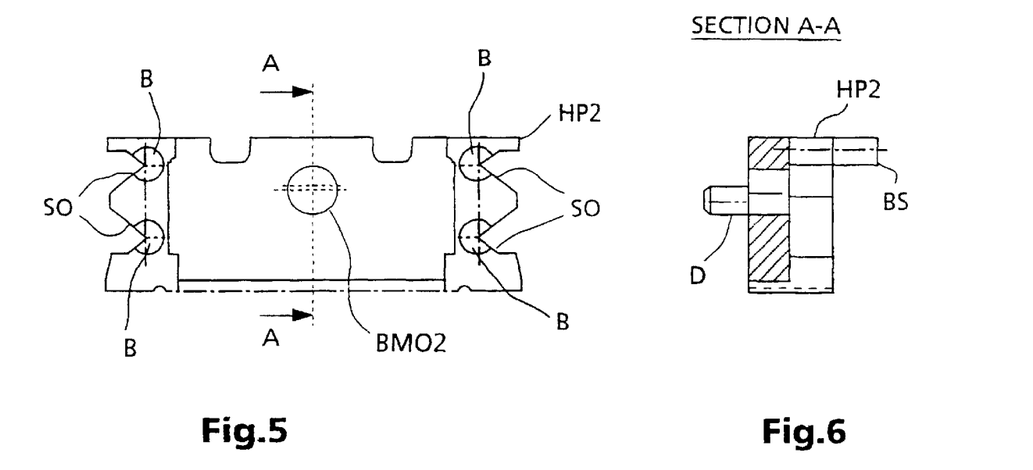
FIG. 5 shows an outline sketch of a front view of a second retaining plate of an optical scanning device having limiting means.
FIG. 6 shows an outline sketch of a side view of a second retaining plate of an optical scanning device having limiting means.

In order to assemble the objective lens holder OH with the retaining system comprising a first retaining plate HP1 and a second retaining plate HP2, the baseplate G and the objective lens holder OH are fixed in a jig, and the wires W which connect the retaining system to the objective lens holder OH are connected by soldering, preferably with the wires W being pre-stressed at solder pads L, to the objective lens holder OH and to the first retaining plate HP1. To this end, the wires W are placed on solder pads L on the objective lens holder OH and are passed through holes B provided in the second retaining plate HP2. FIGS. 4 to 6 show three views of the second retaining plate HP2. The holes B are indicated in FIGS. 4 and 5, and have side openings SO corresponding to FIG. 5. These side openings SO are provided in order to fill the intermediate space between the wire W and the second retaining plate HP2 with silicone after the wires W have been passed through. The silicone which fills the intermediate space between the wire W and the second retaining plate HP2 in this case acts as a damping material, in order to counteract resonance phenomena. A second mounting opening BO2, which is indicated in FIG. 5 and corresponds to the first mounting opening BO1 in the first retaining plate HP1, is provided in the second retaining plate HP2 in order to secure the second retaining plate HP2 to the web S on the baseplate G. The first retaining plate HP1 is aligned with the second retaining plate HP2 during assembly, by pins D indicated in FIG. 4. Furthermore, the second retaining plate HP2 has securing webs BS which are indicated in FIGS. 4 and 6 and limit upward deflection of the objective lens holder OH in an advantageous manner. The objective lens holder OH is connected to the retaining system just via the four wires W and can then not be deflected into an impermissible range by the action of high acceleration forces, such as those which occur if it is dropped, which impermissible range would prevent automatic return to the original rest position due to the elastic limit of the system having been exceeded. The second retaining plate HP2 thus carries out a number of functions, which comprise support for the first retaining plate HP1, damping of the wires W and limiting the deflection of the objective lens holder OH.

Figure 7:
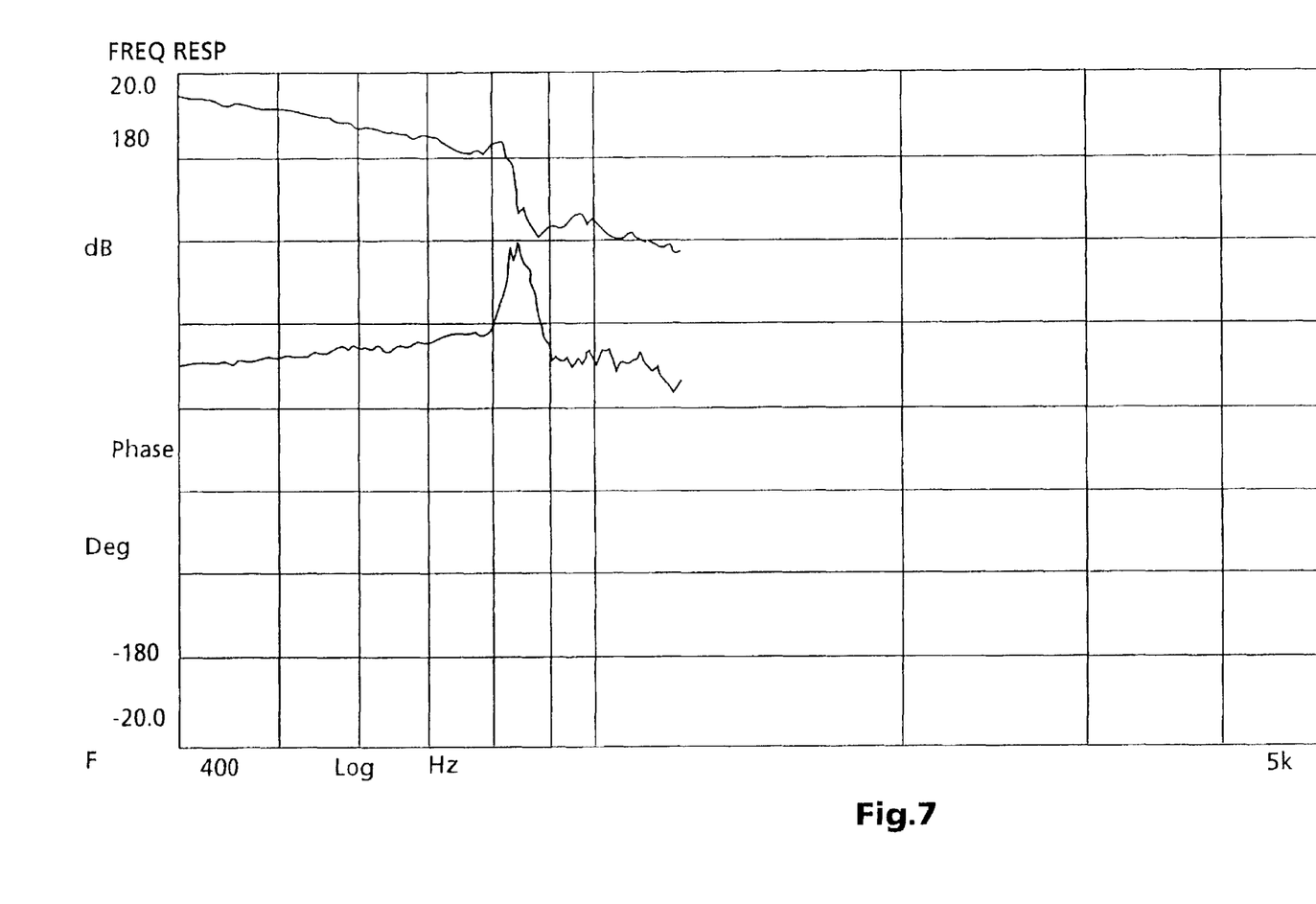
FIG. 7 shows a frequency response and phase diagram of an optical scanning device having a known retaining plate in the focusing direction.
Figure 8:
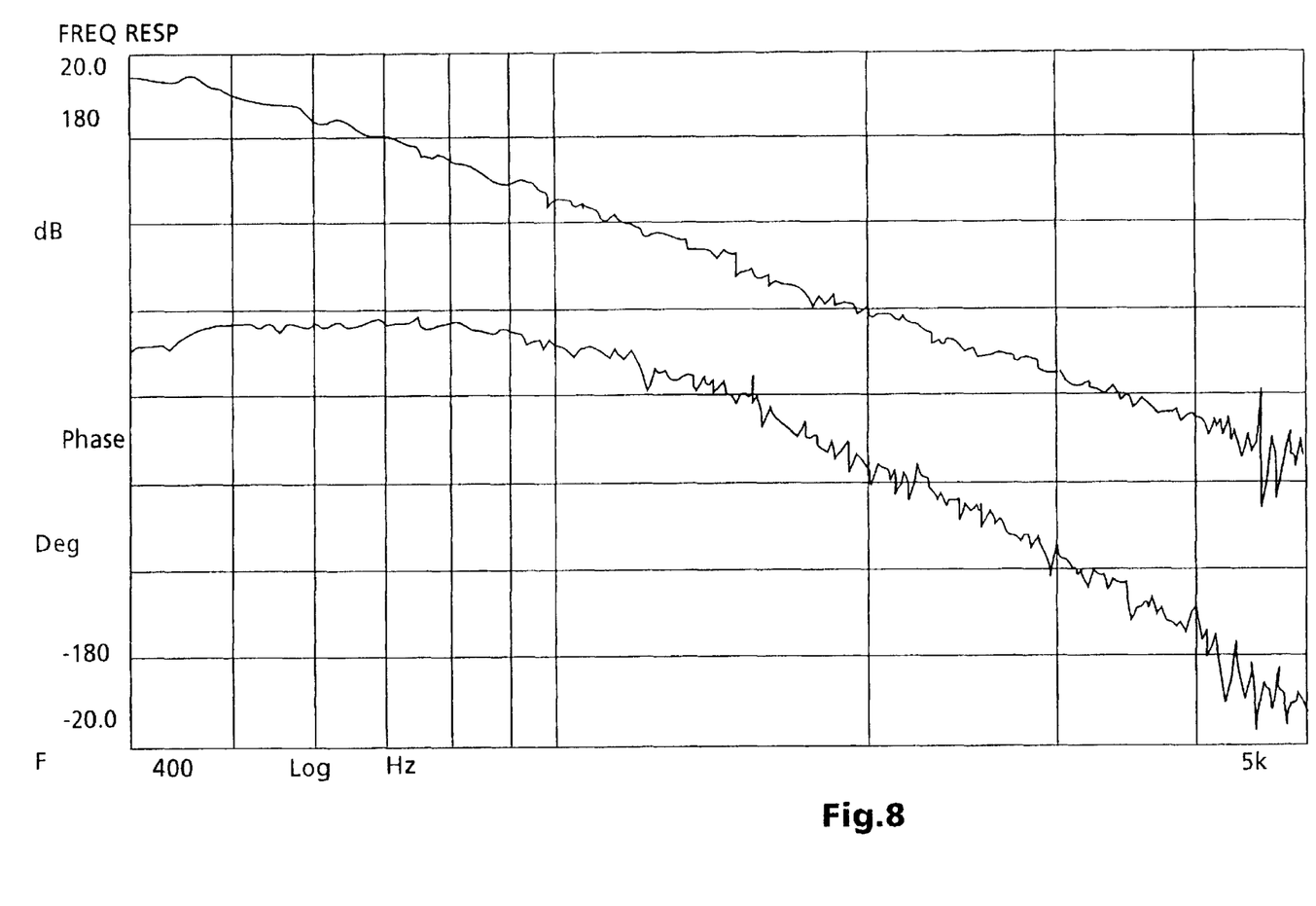
FIG. 8 shows a frequency response and phase diagram of an optical scanning device having a retaining plate according to the invention in the focusing direction.
Figure 9:
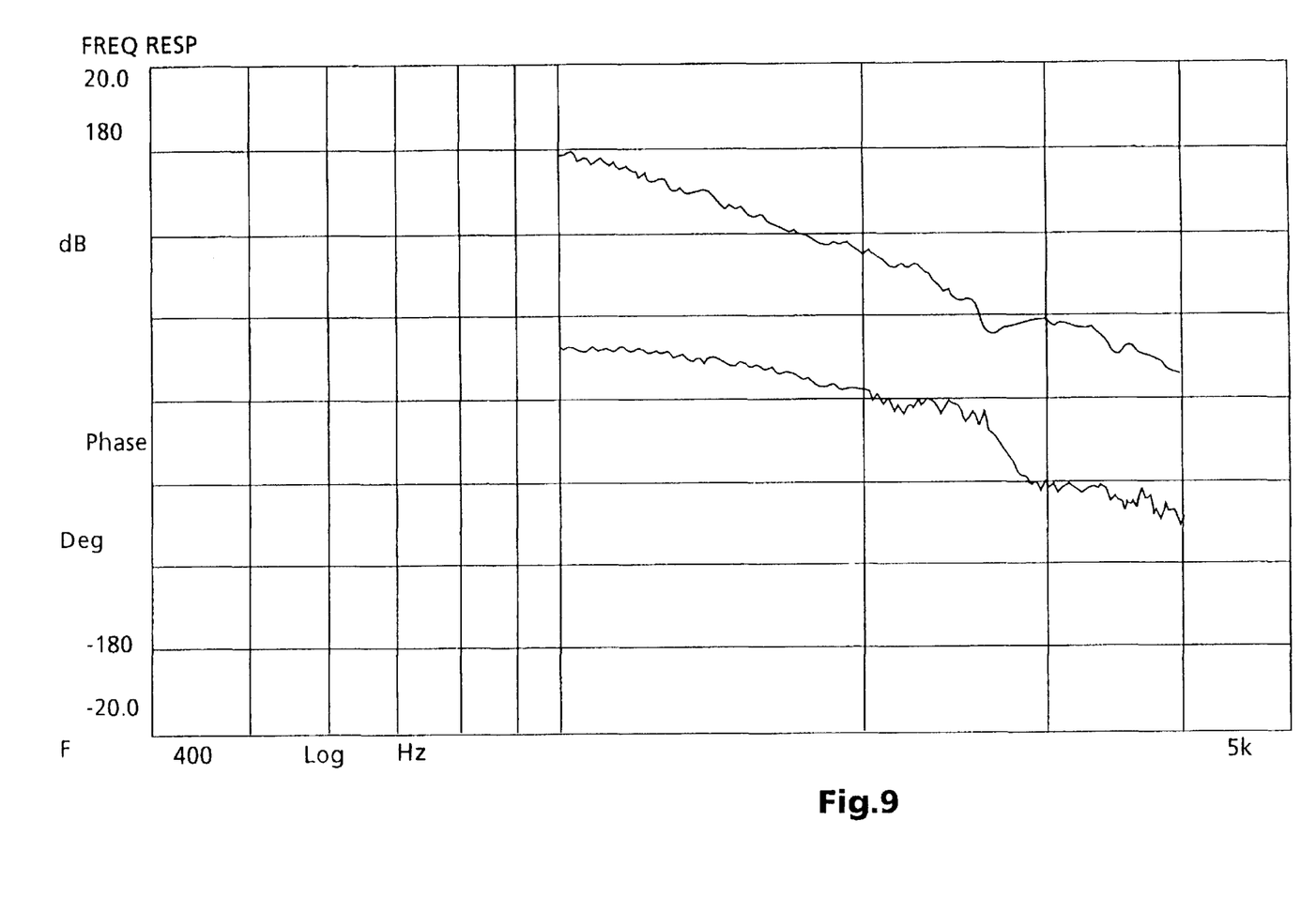
FIG. 9 shows a frequency response and phase diagram of an optical scanning device having a known retaining plate in the tracking direction.
Figure 10:
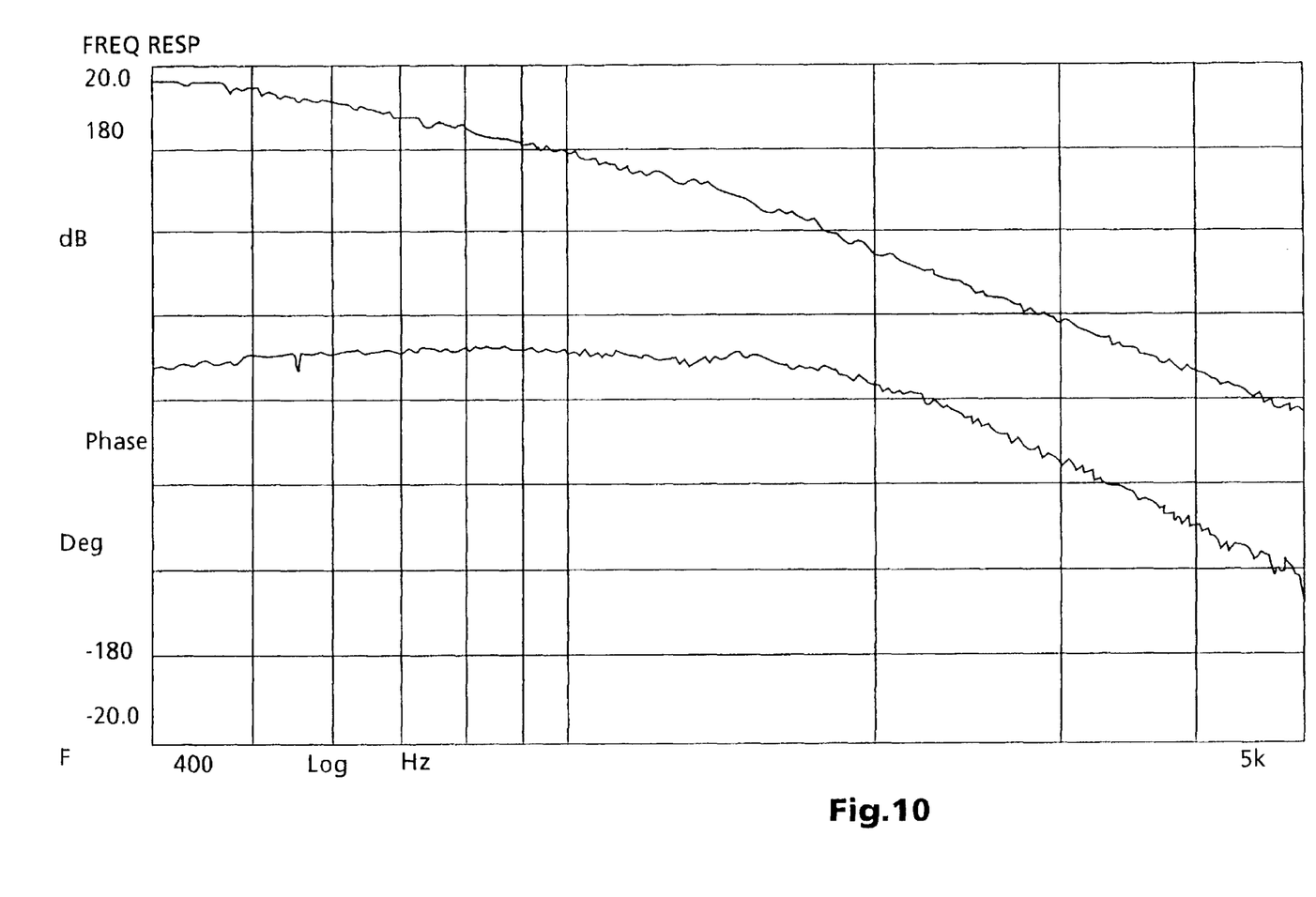
FIG. 10 shows a frequency response and phase diagram of an optical scanning device having a retaining plate according to the invention in the tracking direction.

Although oscillations of the objective lens holder OH and of the wires W are actually damped by the silicone inserted into the intermediate spaces between the wire W and the second retaining plate HP2, it has been found that the response characteristic of the optical scanning device is significantly influenced by the first retaining plate HP1. This becomes clear from measurements that have been carried out, and whose results are shown in FIGS. 7 to 10. FIG. 7 shows a frequency response and phase diagram of an optical scanning device having a known retaining plate HP in the focusing direction, showing the response sensitivity FREQRESP in decibels dB as well as the phase angle Phase in degrees Deg logarithmically Log plotted against the frequency F in Hertz Hz in a range up to five kilohertz 5K. The subsequent frequency response and phase diagrams use an equivalent scale. The diagram, shown in FIG. 7, of an optical scanning device having a known retaining plate HP shows considerable discrepancies from a uniform profile in the range between 800 and 900 Hz, both in terms of the response sensitivity FREQRESP and in terms of the phase angle Phase. These resonance peaks were found in an optical scanning device whose construction corresponds to the optical scanning device according to the invention and shown in FIGS. 2 and 3, but with the difference that a known retaining plate HP was used as the retaining plate HP1. Comparison with the diagram, illustrated in FIG. 8, of an optical scanning device having a retaining plate HP1 according to the invention demonstrates the surprising effect that the disadvantageous characteristics in terms of the response sensitivity FREQRESP and the phase angle Phase are avoided with the retaining plate HP1, in comparable conditions. The scanning device according to the invention and having the characteristics shown in FIG. 8 has an improved response characteristic, since both the frequency response and phase response have a uniform profile and no resonance peaks occur. The said effect occurs not only in the focusing direction but also in the tracking direction, as the following diagrams in FIG. 9 and FIG. 10 clearly demonstrate. FIG. 9 shows the frequency response and phase diagram of the optical scanning device shown in FIGS. 2 and 3 having a known retaining plate HP, in the tracking direction, and FIG. 10 shows the frequency response and phase diagram of the same optical scanning device having a retaining plate HP1 according to the invention, in the tracking direction. Although it had to be assumed that resonance peaks can be avoided by embedding the wires W in silicone in the second retaining plate HP2, it was found that this is appropriate only to an inadequate extent, since the first retaining plate HP1, according to the invention, showed that only its configuration leads to the desired success. The invention is not limited to the version of the optical scanning device described here, but applies in general to optical scanning devices in which the objective lens holder OH is supported on a retaining plate HP by bearing elements.

What is claimed is:
1. Optical scanning device having an improved response characteristic, comprising an objective lens holder which is supported by bearing elements in mounting points on a surface of a retaining plate, wherein, in order to avoid resonance peaks, a second retaining plate is provided which has at least one cutout between each of the mounting points, which separates the mounting points, in the surface which holds the bearing elements for the objective lens holder.

2. Optical scanning device according to claim 1, wherein the bearing elements of the objective lens holder are wires which are connected in solder points to the second retaining plate, and are connected at solder pads to the objective lens holder.

3. Optical scanning device having an improved response characteristic, comprising an objective lens holder which is supported by bearing elements in mounting points on a surface of a retaining plate, wherein the retaining plate is a retaining system which is formed from a first retaining plate and a second retaining plate wherein, in order to avoid resonance peaks, the first retaining plate has at least one cutout between each of the mounting points, which separates the mounting points, in the surface which holds the bearing elements for the objective lens holder.

4. Optical scanning device according to claim 3, wherein the second retaining plate has limiting means in order to limit any deflection of the objective lens holder.

5. Optical scanning device according to claim 4, wherein the limiting means for limiting any deflection of the objective lens holder are limiting webs on the second retaining plate, which separates the mounting points, in the surface which holds the bearing elements for the objective lens holder.

* * * * *